United States Patent
Porta

(10) Patent No.: US 9,086,180 B2
(45) Date of Patent: Jul. 21, 2015

(54) QUICK CONNECT FIRE AND DUST SUPPRESSION SYSTEM

(75) Inventor: Frank Thomas Porta, Charleston, WV (US)

(73) Assignee: Frank T. Porta, Charleston, WV (US)

( * ) Notice: Subject to any disclaimer, the term of this patent is extended or adjusted under 35 U.S.C. 154(b) by 544 days.

(21) Appl. No.: 13/547,034

(22) Filed: Jul. 11, 2012

(65) Prior Publication Data

US 2013/0014963 A1  Jan. 17, 2013

Related U.S. Application Data

(60) Provisional application No. 61/506,501, filed on Jul. 11, 2011.

(51) Int. Cl.

| | |
|---|---|
| *E21F 5/10* | (2006.01) |
| *F16L 37/14* | (2006.01) |
| *E21F 5/00* | (2006.01) |
| *E21F 5/02* | (2006.01) |
| *E21F 5/04* | (2006.01) |
| *E21F 5/06* | (2006.01) |
| *A62C 31/02* | (2006.01) |
| *A62C 35/58* | (2006.01) |
| *B05B 15/06* | (2006.01) |
| *B05B 1/26* | (2006.01) |
| *A62C 35/68* | (2006.01) |

(52) U.S. Cl.
CPC ............... *F16L 37/144* (2013.01); *A62C 31/02* (2013.01); *A62C 35/58* (2013.01); *A62C 35/68* (2013.01); *B05B 1/262* (2013.01); *B05B 1/265* (2013.01); *B05B 1/267* (2013.01); *B05B 15/065* (2013.01); *E21F 5/00* (2013.01); *E21F 5/02* (2013.01); *E21F 5/04* (2013.01); *E21F 5/06* (2013.01); *E21F 5/10* (2013.01); *Y10S 239/04* (2013.01)

(58) Field of Classification Search
CPC ................ E21F 5/00; E21F 5/02; E21F 5/04; E21F 5/06; E21F 5/10; A62C 31/02; A62C 35/58; B05B 15/065; B05B 15/262; B05B 15/265; B05B 15/267; Y10S 239/04; F16L 37/144; F16L 37/088; F16L 25/08; F16L 37/0987; F15B 21/075
USPC ........ 169/16, 37, 64; 239/498, 504, 565, 600, 239/DIG. 4; 285/305, 321, 404, 921; 411/522
See application file for complete search history.

(56) References Cited

U.S. PATENT DOCUMENTS

| | | | | |
|---|---|---|---|---|
| 4,923,350 | A * | 5/1990 | Hinksman et al. | 285/305 |
| 5,513,882 | A * | 5/1996 | Lewis | 285/305 |
| 5,593,187 | A * | 1/1997 | Okuda et al. | 285/305 |
| 8,348,582 | B2 * | 1/2013 | Bithell et al. | 411/522 |

* cited by examiner

*Primary Examiner* — Steven J Ganey

(57) ABSTRACT

A quick connect system for the assembly of underground mining dust and fire suppression systems can eliminate the need for threading pipe with couplings during the installation, reducing installation times approximately 75%. The quick connect system results in the quick and easy coupling and positioning of sprays along the water line. The quick connect system typically uses galvanized, brass and stainless steel components to reduce the need for replacement and to provide for quick adjustment of fittings with sprays using pliers. The system is simple to maintain and reduces high installation and maintenance labor costs. The system uses male and female ported fittings and horseshoe pins. Pendant style or deluge style sprays can be used in the system and can be pre-installed prior to delivery and installation of the system.

8 Claims, 2 Drawing Sheets

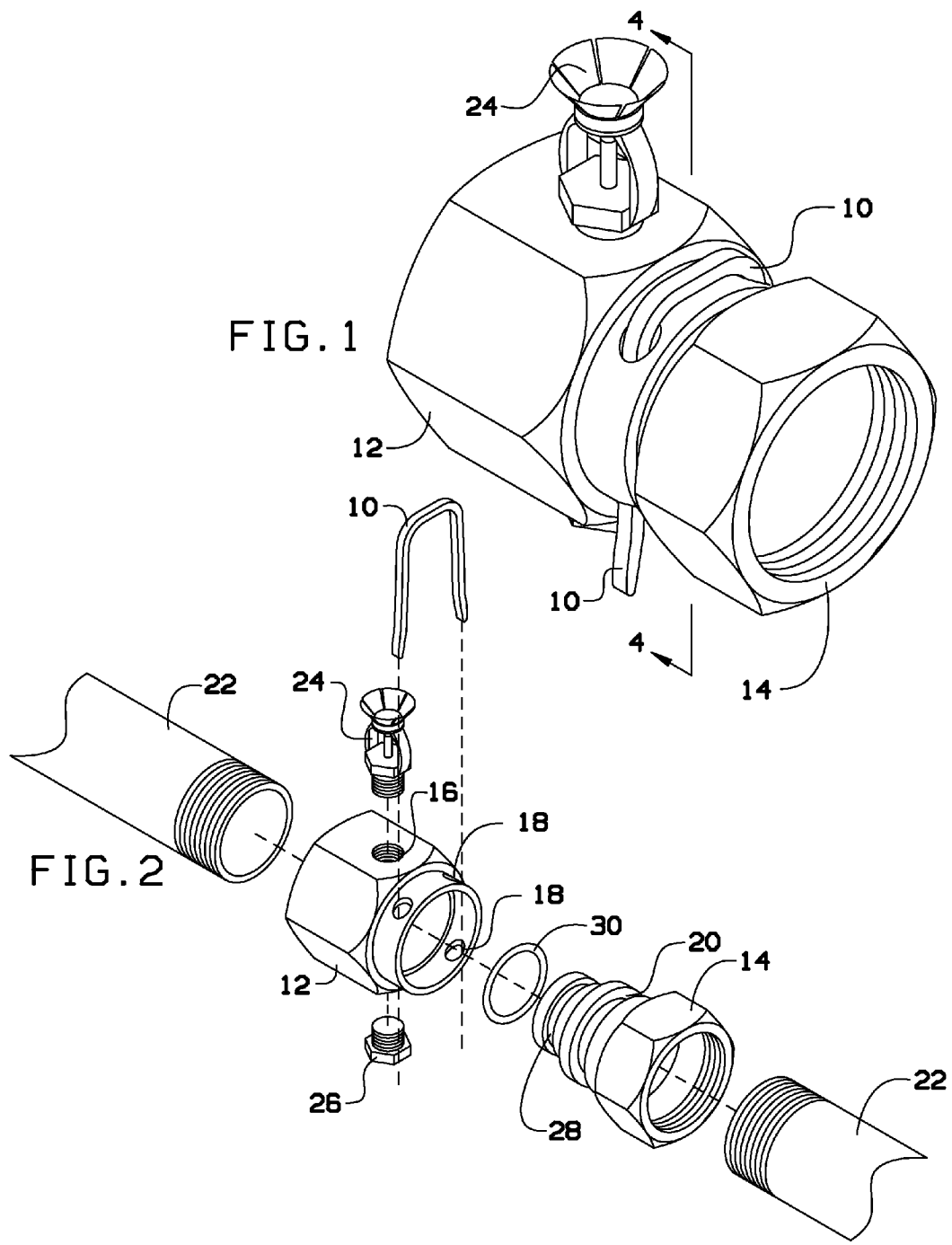

QUICK CONNECT FIRE AND DUST SUPPRESSION SYSTEM

CROSS-REFERENCE TO RELATED APPLICATION

This application claims the benefit of priority of U.S. provisional application No. 61/506,501, filed Jul. 11, 2011, the contents of which are herein incorporated by reference.

BACKGROUND OF THE INVENTION

The present invention relates to mining operations accessories and, more particularly, to a quick connect fire and dust suppression system for mining applications.

Current mining regulations require a sprinkler every 8 feet. A significant cost, in time and expense, is the labor intensive plumbing and pipe installation work resulting from pipe fitting, bolting and threading that is required for fire suppression and dust control situations in undergrounding mining applications. These installations also require a number of wrenches and plumbing tools that can further add to the expense.

Over time, spray positioning, angle adjustment and internal corrosion can cause major maintenance issues after continued use, resulting in the need for re-adjustment and replacement of rusty fittings and clogged sprays.

As can be seen, there is a need for an improved system for installing and maintaining fire and dust suppression systems in underground mining applications.

SUMMARY OF THE INVENTION

In one aspect of the present invention, a quick coupling system comprises a female quick coupling having female pipe threads disposed on one end thereof; a set of pin holes formed at a second, opposite end of the female quick coupling; a male quick coupling having an O-ring disposed about a first end thereof, where the first end of the male quick coupling fits into the second end of the female quick coupling; a pin locking slot cut circumferentially about the first end of the male quick coupling; and a horseshoe-shaped pin operable to fit into the pin holes of the female quick coupling and through the pin locking slot of the male quick coupling to retain the female quick coupling to the male quick coupling.

In another aspect of the present invention, a fire and dust suppression system for mining applications comprises a plurality of pipes having a first end of a female quick coupling threadably disposed at a first end thereof; one or more threaded holes formed through the female quick coupling; a sprinkler head installed in at least one of the one or more threaded holes; a set of pin holes formed at a second, opposite end of the female quick coupling; a male quick coupling threadably disposed on a second end of the plurality of pipes, the male quick coupling having an O-ring disposed about a first end thereof, where the first end of the male quick coupling fits into the second end of the female quick coupling; a pin locking slot cut circumferentially about the first end of the male quick coupling; and a horseshoe-shaped pin operable to fit into the pin holes of the female quick coupling and through the pin locking slot of the male quick coupling to retain the female quick coupling to the male quick coupling.

These and other features, aspects and advantages of the present invention will become better understood with reference to the following drawings, description and claims.

BRIEF DESCRIPTION OF THE DRAWINGS

FIG. 1 is a perspective view of a quick connect device for fire and dust suppression systems in underground mining applications according to an exemplary embodiment of the present invention;

FIG. 2 is an exploded perspective view of the quick connect device of FIG. 1, showing attachment of water pipes;

DETAILED DESCRIPTION OF THE INVENTION

Figure 3:
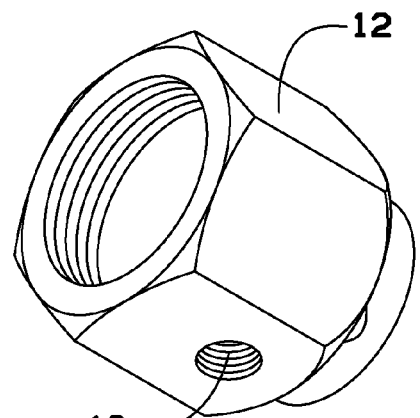
FIG. 3 is a perspective view of a female quick coupling of the quick connect device of FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a quick connect system for the assembly of underground mining dust and fire suppression systems. The quick connect system can eliminate the need for threading pipe with couplings during the installation, reducing installation times approximately 75%. The quick connect system results in the quick and easy coupling and positioning of sprays along the water line. The quick connect system typically uses galvanized, brass and stainless steel components to reduce the need for replacement and to provide for quick adjustment of fittings with sprays using pliers. The system is simple to maintain and reduces high installation and maintenance labor costs. The system uses male and female ported fittings and horseshoe pins. Pendant style or deluge style sprays can be used in the system and can be pre-installed prior to delivery and installation of the system.

The requirement in underground mining applications for fire suppression and dust control is varied, and with the ease of installation and convenience of the quick-change coupling system of the present invention, the individual pipe sections can be attached to any stable structure to allow for compliance with regulatory stipulations. The user can determine the mounting apparatus, and the pipe sections can be hung together using pipe hangers.

The individual pipe sections can be inserted together utilizing a horseshoe clip, as described in greater detail below, with a small hammer, and spray angle and positioning is accomplished using pliers. Disassembly and re-installation are cost-effective using a screw driver to remove the horseshoe clip. The pipe sections can be pulled apart, removed and utilized in future applications.

Referring now to FIGS. 1 through 4, a female quick coupling 12 can have standard female pipe threads on one end thereof, sized appropriately for the size of pipe 22 used in the installation. One or more sprinkler holes 16 can be tapped through the female quick coupling 12. A sprinkler head 24 or a plug 26 can be threaded into the sprinkler hole(s) 16, as desired.

Figure 4:
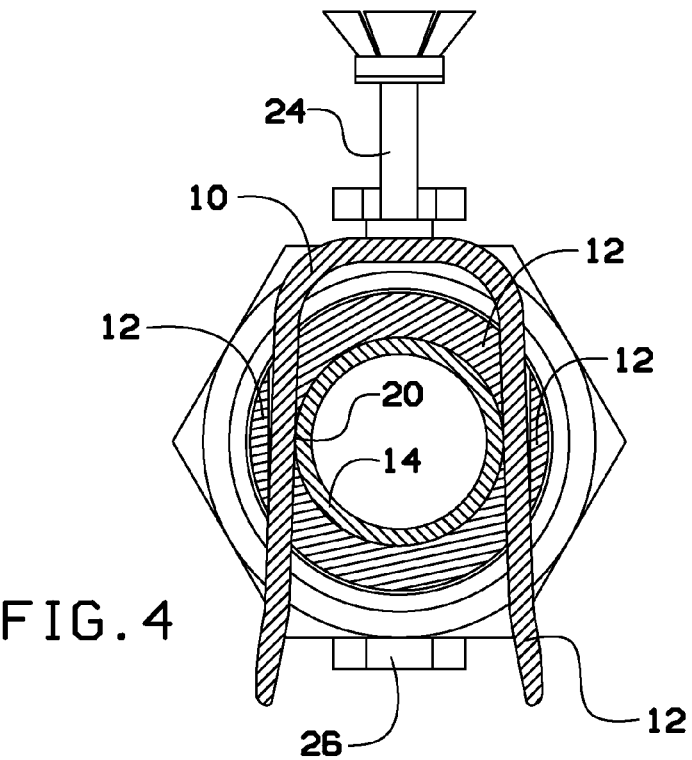
FIG. 4 is a cross-sectional view taken along line 4-4 of FIG. 1.

Pin holes 18 can be formed through the female quick coupling 12. The pin holes 18 are adapted to receive a horseshoe pin 10 that can fit through the pin holes 18 and protrude into the inside of the female quick coupling 12 as shown in FIG. 4.

A male quick coupling 14 has an O-ring shoulder 28 adapted to accept an O-ring 30 thereinto. One end of the male quick coupling 14 has standard female pipe threads on one end thereof, sized appropriately for the size of pipe 22 used in the installation. The other side of the male quick coupling 14 can fit into the female quick coupling 12. The O-ring can create a sealed engagement between the male quick coupling 14 and the female quick coupling 12.

A pin locking slot 20 can be formed circumferentially about the male quick coupling 14. When the horseshoe pin 10 is slid through the pin holes 18 of the female quick coupling 12, the horseshoe pin 10 engages into the pin locking slot 20, retaining the male quick coupling 14 in a sealing engagement with the female quick coupling 12. The horseshoe pin 10 can be easily slid into the pin holes 18 and the pin locking slot 20, typically requiring only a simple hammer to accomplish this task. Such an installation can be done by a single person, eliminating the requirement for specialized tools and extra plumbing assistants.

As discussed above, the female quick coupling 12 can include multiple sprinkler holes 16. These sprinkler holes 16 can be disposed in a 180 degree relationship as shown in the figures or may be disposed at any angle about the female quick coupling 12, such as in a 90 degree relationship. This double porting on the female quick coupling 12 allows for branch circuitry for remote sprinkler/spray application. Branch tee fittings may also be inserted to accommodate customized location applications.

Typically, the system of the present invention can be factory prepared with the female and male quick couplings 12, 14 pre-threaded on the pipe 22. Moreover, the desired sprinkler head 24 can also be pre-installed in the female quick coupling 12. This way, to install the system in a mining application, the installer would simply need to position the pipe, engage the quick couplings 12, 14 together, and insert the pin 10 through the pin hole 18 and the pin locking slot 20. Without having to thread pipe together within the underground mining environment, labor cost and time is saved with the quick coupling system of the present invention.

The system of the present invention can be designed to accommodate various sized systems. For example, the pipe 22 can vary in size from about ½ inch through 3 inches, typically from about 1 to 2 inches in diameter. The length of the pipe 22 can vary due to regulatory requirements, but is typically less than 8 feet long, usually about 7 feet long. Typically the pipe 22 can be made of galvanized steel while the quick couplings 12, 14 can be made of stainless steel or brass.

While the above describes a fire and dust suppression system for mining applications, the system described above could be used in other applications, such as above-ground fire suppression and dust control applications.

It should be understood, of course, that the foregoing relates to exemplary embodiments of the invention and that modifications may be made without departing from the spirit and scope of the invention as set forth in the following claims.

What is claimed is:

1. A quick coupling system comprising:
    a female quick coupling having female pipe threads disposed on one end thereof;
    one or more threaded holes formed through the female quick coupling;
    a sprinkler head installed in at least one of the one or more threaded holes;
    a set of pin holes formed at a second, opposite end of the female quick coupling;
    a male quick coupling having an O-ring disposed about a first end thereof, where the first end of the male quick coupling fits into the second end of the female quick coupling;
    a pin locking slot cut circumferentially about the first end of the male quick coupling; and
    a horseshoe-shaped pin operable to fit into the pin holes of the female quick coupling and through the pin locking slot of the male quick coupling to retain the female quick coupling to the male quick coupling.

2. The quick coupling system of claim 1, wherein the one or more threaded holes includes two threaded holes disposed 180 degrees apart from each other about the female quick coupling.

3. The quick coupling system of claim 2, further comprising a sprinkler head in a first one of the two threaded holes and a plug in a second one of the two threaded holes.

4. A fire and dust suppression system for mining applications comprising:
    a plurality of pipes having a first end of a female quick coupling threadably disposed at a first end thereof;
    one or more threaded holes formed through the female quick coupling;
    a sprinkler head installed in at least one of the one or more threaded holes;
    a set of pin holes formed at a second, opposite end of the female quick coupling;
    a male quick coupling threadably disposed on a second end of the plurality of pipes, the male quick coupling having an O-ring disposed about a first end thereof, where the first end of the male quick coupling fits into the second end of the female quick coupling;
    a pin locking slot cut circumferentially about the first end of the male quick coupling; and
    a horseshoe-shaped pin operable to fit into the pin holes of the female quick coupling and through the pin locking slot of the male quick coupling to retain the female quick coupling to the male quick coupling.

5. The fire and dust suppression system of claim 4, wherein the one or more threaded holes includes two threaded holes disposed 180 degrees apart from each other about the female quick coupling.

6. The fire and dust suppression system of claim 4, further comprising a sprinkler head in a first one of the two threaded holes and a plug in a second one of the two threaded holes.

7. The fire and dust suppression system of claim 4, wherein the plurality of pipes have a length less than 8 feet long.

8. The fire and dust suppression system of claim 4, wherein the male quick coupling and the female quick coupling are made from stainless steel or brass.

* * * * *